July 1, 1930.  C. A. JACKSON  1,769,838
GOVERNOR PRESSURE SYSTEM
Filed Jan. 26, 1926   2 Sheets-Sheet 1

Inventor
Charles A. Jackson
By his Attorneys

July 1, 1930.  C. A. JACKSON  1,769,838
GOVERNOR PRESSURE SYSTEM
Filed Jan. 26, 1926  2 Sheets-Sheet 2
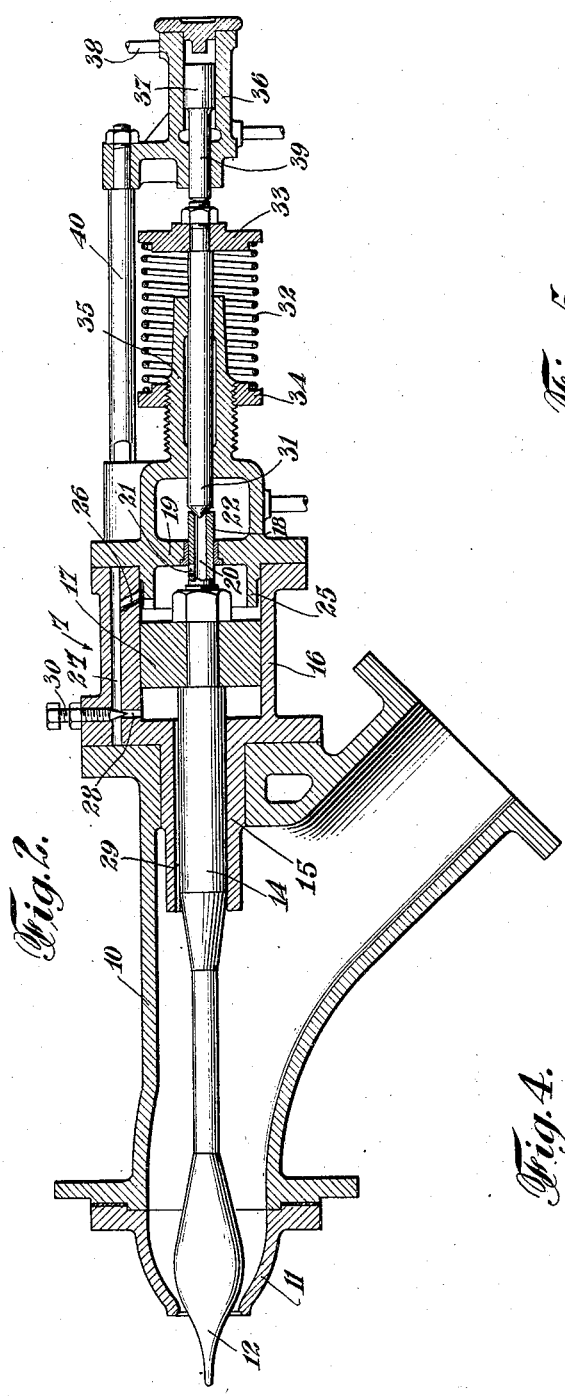
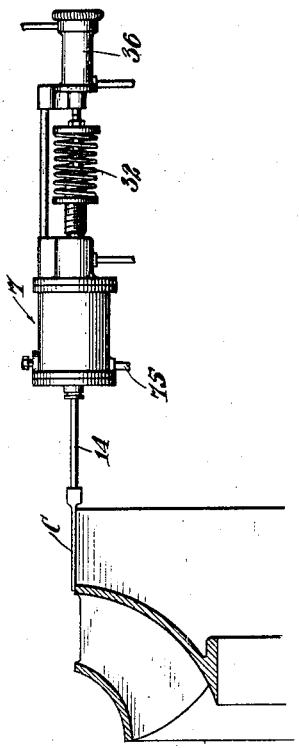
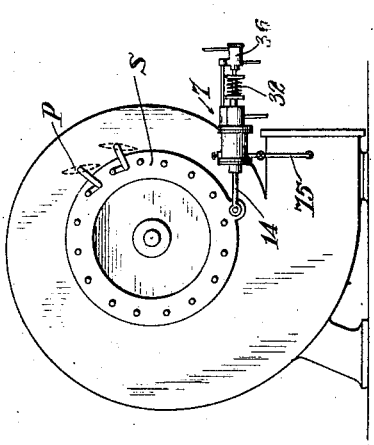
Inventor
Charles A. Jackson
By his Attorneys
Edwards, Sager & Bower Patented July 1, 1930

1,769,838

UNITED STATES PATENT OFFICE

CHARLES A. JACKSON, OF RIDGEWOOD, NEW JERSEY

GOVERNOR PRESSURE SYSTEM

Application filed January 26, 1926. Serial No. 83,811.

This invention relates to a pressure system and to pressure controlling means therefor and is particularly applicable to hydraulic turbine control.

In power plants there is usually a number of turbine units, each having a fluid pressure controlled or operated gate mechanism. The fluid pressure is served to all the units from a common source, such as a pump. Heretofore, the pump has discharged, by either intermittent or continuous operation, enough fluid for controlling simultaneously all the units. During continuous operation the volume of discharge is substantially constant irrespective of whether it is needed. When the gate mechanisms are stationary, or being moved very little, fluid demand is low and if continuous pump operation is employed relief valves must be provided to take care of the excess flow. In this way the required pressure of the fluid is substantially maintained, but, of course, the fluid discharged through the relief valves is wasted power and in general it is found that such a system is not thoroughly reliable or economical. The intermittent operation also requires relief valves and moreover, the continuous starting and stopping of the pump produces harmful shocks and pressure fluctuations. The system disclosed herein, is applicable either to the control of only one turbine unit or to as many as desired and eliminates the above objections and has certain other advantages to be mentioned later.

It is an object of my invention to provide an improved system and means for controlling the fluid pressure. A further object is to provide improved means whereby the volume of fluid discharged from the generating means will only be substantially equal to the demand. Another object is to provide improved means for controlling the volume of discharge automatically in accordance with the demand. A further object is to provide an improved system and means for maintaining the pressure substantially constant throughout variations in operation of the pressure generating means. Another object is to provide an improved system whereby the actuating means, such as a suitable prime mover for the pressure generating means, is controlled by the generated pressure. Another object is to provide improved means for varying the speed of the pressure generating means automatically in accordance with any variations in fluid demand or pressure from normal. More specifically, it is an object to provide a hydraulic prime mover of any suitable type for actuating the pressure generating means, and to provide means for controlling power flow to the prime mover by the generated pressure. The prime mover, if hydraulic, could be an impulse or reaction turbine. Electrical apparatus could be used for actuating the generating means and in such a case the apparatus would be provided with a suitable rheostat or the like, which would be controlled by the generated pressure to vary the speed of the driving motor and generating means. The hydraulic prime mover, however, has certain advantages.

Other objects will appear from the following description of the accompanying drawings, in which Fig. 1 is a diagrammatic view of the system;

Fig. 2 is an enlarged sectional view of the control means in an intermediate position;

Figs. 4 and 5 are diagrammatic views showing reaction turbines provided respectively with pivot and cylinder gate mechanisms controlled by the improved controlling mechanism.

Figure 1:
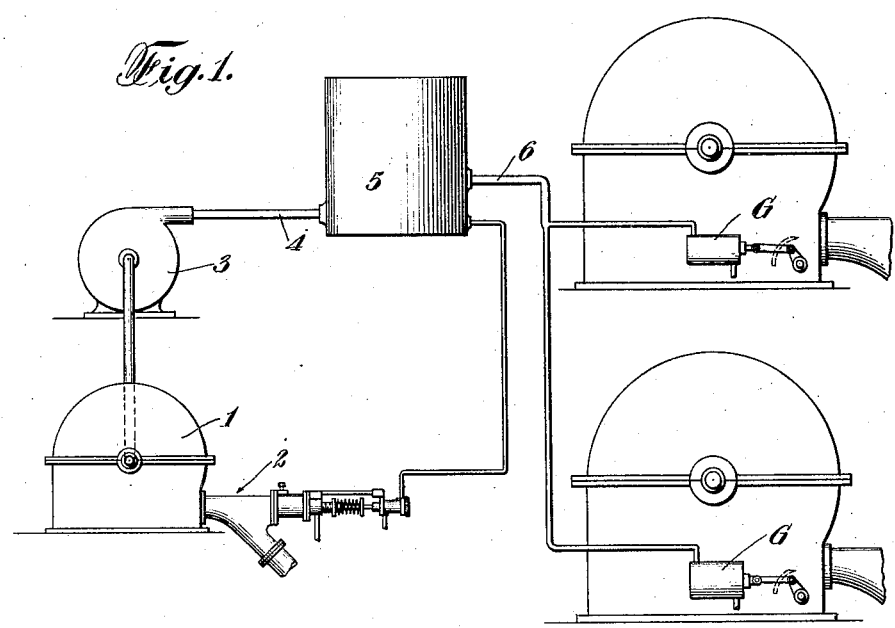

In the illustrative embodiment of my invention there is shown a turbine 1, specifically of the impulse type but which could be of the reaction type or any other suitable type of prime mover. An inlet or flow control mechanism 2, specifically a needle nozzle, regulates fluid flow to the turbine and thereby controls its speed and the speed of a pressure generating unit 3 which is connected to the turbine, either directly or if desired by belt and pulley, or gear connections. A pipe 4 conducts the discharged pressure fluid from the pump unit 3 to an accumulator 5 from which any pipe connections 6 could lead to the several turbine gate control mechanisms G which are supplied with hydraulic pressure from the accumulator. During certain periods the demand for hydraulic pressure upon the accumulator may be below normal, in which case it is desired to reduce the rate of discharge from the pumping unit instead of having the unit discharge at its normal rate and necessitating the use of relief valves to take care of the excess pump discharge. To reduce the pump speed in accordance with the demand, a power control mechanism 7, is controlled by fluid from the accumulator 5.

The nozzle and controlling mechanism therefor comprises a casing 10 provided with a usual discharge nozzle 11 and controlling needle 12, fluid being supplied to the nozzle from tangential passageway 13. The needle shaft is provided with an enlarged portion 14 which extends through a portion 15 projecting forwardly from a cylinder 16 and is secured to a piston 17 disposed therein. A reduced stem 18 extends through suitable packing in a wall 19 and is provided with a passage 20 and port 21 to allow communication between an exhaust chamber 22 and the rear cylinder end. An annular portion 25 projects into the cylinder and has a reduced portion to provide a passageway from the rear cylinder end to the fluid way 13 as by a port 26, passage 27, a port 28 which communicates with the front cylinder end, and a passage 29. A needle valve 30 can be adjusted for various openings through passage 28.

Mechanism for positioning the nozzle flow control means comprises controlling passage 20 and a valve stem 31 which is normally urged rearwardly by a spring 32 engaging a collar 33 secured to the stem 31 and a collar 34 adjustably mounted upon a guide portion 35 through which the stem 31 extends. The stem 31 is controlled by fluid pressure from the accumulator through the provision of a cylinder 36 within which a piston 37 is disposed, the rear cylinder end having communication with the accumulator as by a pipe 38 while the front cylinder end is always open to exhaust. A stem 39 projects forwardly from the piston 37 and abuts the stem 31. The cylinder 36 is carried by a suitable rod connection 40 extending from the cylinder 16 and comprises a unit separable from the device and while so separated is self-contained in that the piston and cylinder remain in operative relation to form the fluid pressure chambers.

The operation is as follows: When the system is normally operative the pressure in the accumulator is maintained constant due to the volume of fluid demand by the controlling mechanisms for the several turbine units being equal to the volume supplied to the accumulator by the pumping mechanism 3. In this case the needle valve will be held stationary due to both sides of piston 17 being subjected to full pressure transmitted from the passage 13 through passages 29, 28, 21 and 36, it being understood that fluid pressure on the right side of piston 17 cannot escape through passage 20 due to stem 31 closing the same. This stem is held in a stationary position whenever the accumulator pressure acting on piston 37 is balanced by the pressure of spring 32. If the gate mechanism of the turbine units is stationary or being moved very little so that there is little or no demand upon the accumulator for controlling fluid, accumulator pressure will increase due to pump discharge being greater than accumulator discharge. Hence, the increased accumulator pressure acting on piston 37 will move the needle nozzle in a closing direction, thereby slowing down the speed of turbine 1 and accordingly reducing the rate of discharge from the pump 3. The needle nozzle will keep gradually moving in a closing direction to slow down the pump speed until the supply to and demand upon the accumulator is equal. Thereafter the stem 31 and piston 37 will assume a stationary position and allow the needle nozzle to have a set position. If the demand upon the accumulator should drop to zero accumulator pressure would so increase as to move piston 37 to its extreme left hand position, thereby completely closing the needle nozzle.

On the other hand, when the gate mechanism of the main turbines is being moved to such an extent that the controlling fluid demand upon the accumulator is greater than the supply thereto, accumulator pressure will drop and spring 32 will move stem 31 and piston 37 in a right hand direction until the spring pressure and fluid pressure are equal. As the stem 31 opens passage 20 fluid on the right side of piston 17 is immediately discharged into exhaust chamber 22, but due to the adjustable needle valve 30 substantially full pressure will be maintained on the left side of piston 17, and accordingly move the needle nozzle in an opening direction, thereby increasing the speed of the turbine 1 and accordingly increase the rate of pump discharge until the supply equals the demand. When this latter condition exists the stem 31 and piston 37 will again be held in a stationary position and the passage 20 will be closed due to piston 17 moving in a right hand direction until stem 18 engages stem 31. By adjusting collar 34 any one of various predetermined accumulator pressures may be had.

Figure 3:
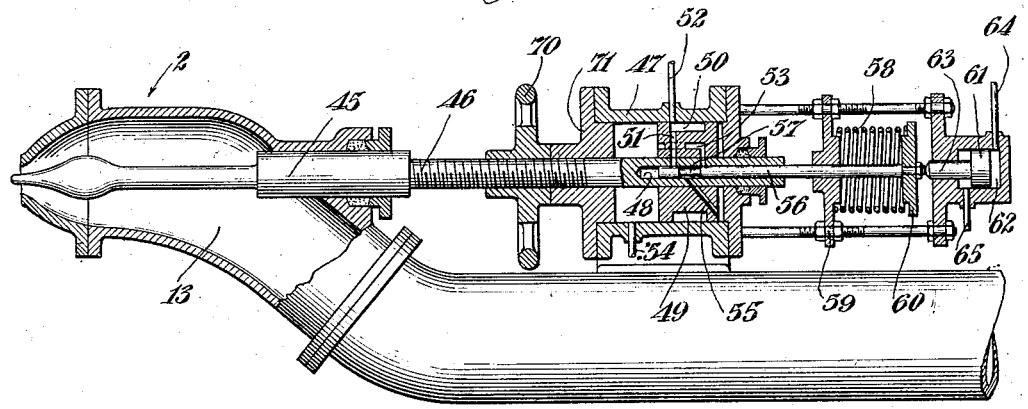
Fig. 3 is a modified form of the control.

In the modified form shown in Fig. 3 the power control means 12 is moved in an opening direction by fluid pressure disposed entirely in the conduit 13 and is moved only in a closing direction by fluid from the accumulator or other external source. To accomplish this a plunger 45 formed on the needle stem extends through a suitable packing gland, thereby causing the respective plunger ends to be subjected to atmospheric and fluid pressure. A reduced stem 46 extends entirely through a cylinder 47 and is provided with a bore 48. A piston 49 secured to the rod 46 has an annular chamber 50 with which the bore 48 communicates as by a passage 51 while a pressure supply pipe 52 leading either from the accumulator or other source communicates with the annular chamber. The bore 48 is adapted to communicate with the left cylinder end as by an L-shaped exhaust passage 53. An exhaust pipe 54 keeps the left cylinder end in an exhausted condition at all times. A passage 55 permits supply and exhaust of fluid to the right cylinder end, which passage is controlled by a stem 56 having an annular groove 57 intermediate its ends. The stem or valve 56 is moved longitudinally, so as to place passage 55 in communication with either pressure supply passage 51 or exhaust passage 53, by a spring 58 which is interposed between a fixed head 59 and a collar 60 secured to the stem 56. A piston 61 disposed within a cylinder 62 has a stem 63 adapted to abut the stem 56. Fuid pressure is supplied from the accumulator to the cylinder 62 as by a pipe 64 while the front cylinder end is always exhausted by a pipe 65.

To control the needle nozzle manually, a hand wheel 70 has adjustable threaded engagement with the stem 46 and is adapted if desired to be used as a means for limiting opening movement of the needle valve as by abutting the front cylinder head 71. By moving the hand wheel in either direction the degree of opening may be varied. If it is desired to close the nozzle, irrespective of the remaining controlling mechanism, rotation and movement of the hand wheel in a right hand direction will move rod 46 and needle 12 in a closing direction, even against pressure existing on the inner side of plunger 45.

The controlling influences such as fluid demand by the controlling units on the several turbines are the same in the modified form as in the preferred. When the system is started by admitting fluid to passage 13 pressure acting on the large inner end of plunger 45 will move the needle 12 in an opening direction. During opening movement the rear end of cylinder 47 is exhausted due to communication between passage 55, annular groove 57, exhaust passage 53, and pipe 54, actuating fluid pressure to the rear cylinder end being shut off by the stem 56 covering passage 51, the stem 56 as shown in Fig. 4 being in a neutral position.

When the demand upon the accumulator drops, accumulator pressure will be temporarily slightly increased and transmitted to cylinder 62 as by pipe 64 and thereby move stem 56 against the tension of spring 58 to admit actuating fluid pressure to the right end of cylinder 47 as by pipe 52, annular groove 50, passage 51, annular groove 57, and passage 55. This fluid moves piston 49 and needle 12 in a closing direction, thereby reducing the speed of the turbine and generating unit until the proper balance between the pressure demand and supply is obtained. When the piston 49 has moved a distance sufficient to reduce the speed of the generating unit to the necessary amount, the passage 51 will be closed for the reason that the stem 56 will be held in a substantially stationary position. If the fluid demand drops still further accumulator pressure will again temporarily increase and force stem 56 in a left hand direction to again allow actuation of piston 49. If the demand should increase, the accumulator pressure will temporarily drop and permit spring 58 to move stem 56 in a right hand direction and exhaust the rear cylinder end as by communication between passages 55 and 53 through annular groove 57. Pressure acting on the inner end of plunger 45 will move the needle nozzle in an opening direction.

If the hydraulic prime mover was of the reaction type, rather than the impulse type, and included usual flow control mechanisms suitable for reaction type turbines the same general controlling mechanism might be employed as is shown for controlling the needle nozzles. The nozzle stems in either form could simply be connected to the shifting ring of the pivoted gate mechanism or could serve as an actuating rod for moving the usual type of cylinder gate. Such arrangements are diagrammatically shown in Figs. 4 and 5 the pivoted gates being indicated at P and the shifting ring at S, while the cylinder gate mechanism is indicated at C. In any form, however, the mode of operation of the controlling means for the gate mechanism will be the same as shown in Figs. 2 and 3. In each case a pipe 75 conducts pressure to the end of cylinder 16 from the turbine fluid supply conduit, the pipe being the equivalent of passage 29. If the modified form in Fig. 3 is used the part of the casing for passage 13 adjacent plunger 45 could be used and to which fluid would be supplied also as by a pipe 75. In this case the needle stem would extend through a suitable packing.

Many advantages are obtained from the disclosure herein made, such, for instance, that it avoids the use of intermittent unloading valves or intermittent starting and stopping of the pumps and thus not only maintains a steady oil pressure subject to much less fluctuation than can be obtained by intermittent supply, but also avoids noise and shocks of unloading valves or of sudden starting and stopping of motors, and in the preferred form wherein a hydraulic prime mover is used there is the advantage over electrical apparatus of having the supply of oil to the governors entirely independent of the electrical system in the power house, so that even in case of short circuits and accidents to the electrical system pressure is still maintained for the governors. Further, at times of emergency the system gives full reliance that the turbines will remain under full control. In small installations the system is advantageous on account of its simplicity and cheapness and is valuable in large installations on account of the features above mentioned.

A further advantage over the electrical apparatus is that in case of a sudden demand for controlling fluid resulting in pressure dropping considerably below normal the hydraulic prime mover is capable of speeding up above normal and thereby tends to restore pressure more rapidly than could be accomplished with an electrically driven pump, the maximum speed of which is usually fixed by the number of cycles of the system. While hydraulic prime movers have the above advantages over the electrical apparatus it is, of course, possible, as previously pointed out, to employ in connection with an electrically driven pump the principles embodied in the controlling mechanism for the hydraulic prime mover. The principle of controlling automatically the rate of discharge is applicable to those devices wherein a variable controlling mechanism is interposed between the actuating and generating means. By having the actuated stem suitably connected to the interposed controlling mechanism a variable rate of operation of the generating means could be had while the actuating means remained normally operative. It will also be seen that the system herein disclosed comprises what might be termed a closed pressure system, in distinction to those systems employing relief valves or other pressure and volume reducing or relieving mechanisms.

The relief or unloading valves usually employed to control the fluid pressure are of the automatic type which control a by-pass so that when a drop in pressure from the point at which the unloader loads and unloads or closes and opens the by-pass is usually about 10% of the normal operating pressure. If the maximum pressure should be 200 pounds per square inch at which the unloader opens the by-pass then the minimum pressure at which it would close the by-pass and renew pumping into the system would be about 180 pounds. With such a construction and mode of operation it will be seen that the pressure is not substantially constant, whereas in my improved construction and mode of operation a substantially constant pressure is obtained in addition to the other advantages spoken of.

I claim:

1. A governing system comprising fluid pressure generating means for supplying fluid pressure to gate controlling mechanism of a hydraulic turbine, and means for varying the rate of operation of the generating means while the latter remains in a complete operative condition, said varying means including controlling means rendered operative automatically in accordance with the degree of gate mechanism operation.

2. A governing system comprising a turbine unit having fluid controlled gate mechanism, fluid pressure generating means for supplying the controlling fluid thereto, means separate from said turbine for actuating said generating means, and means for varying the rate of operation of said generating means automatically in accordance with the controlling fluid demand.

3. A governing system comprising a turbine unit having fluid controlled gate mechanism, fluid pressure generating means for supplying the controlling fluid thereto, and means for effecting a rate of supply substantially equal to the demand including means for varying the rate of operation of said generating means automatically in accordance with the controlling fluid demand thereby to maintain said equality.

4. A governing system comprising a turbine unit having fluid controlled gate mechanism, fluid pressure generating means for supplying the controlling fluid thereto, and means for varying the rate of operation of said generating means automatically in accordance with the demand for controlling fluid, said rate varying means being controlled by the generated pressure.

5. A governing system comprising a turbine unit having fluid controlled gate mechanism, fluid pressure generating means for supplying the controlling fluid, and means for varying the rate of operation of said generating means in accordance with fluid demand, said generating means being in a closed pressure system.

6. In a governing system, the combination comprising a hydraulic turbine having fluid controlled gate mechanism, fluid pressure generating means for supplying controlling fluid thereto, and means for controlling the fluid pressure for said gate controlling mechanism, said generating and controlling elements forming a closed pressure system.

7. In a governing system, the combination comprising a turbine unit having fluid controlled gate mechanism pressure generating means for supplying fluid to said gate control mechanism, hydraulic actuating means therefor, and means controlled by the generated pressure for controlling flow to said hydraulic means.

8. In a governing system, the combination comprising fluid pressure generating means, a hydraulic prime mover for actuating the same, a turbine having a member controlled by the generated pressure, and means for varying the rate of flow to the prime mover automatically in accordance with the demand for pressure fluid upon said generating means, including actuating means controlled in accordance with the speed of operation of the generating means.

9. In a governing system, the combination comprising pressure generating means, hydraulic actuating means therefor having flow control mechanism, a member controlled by the generated pressure, and means for controlling said flow mechanism actuated by fluid pressure flowing to said hydraulic actuating means, and means for actuating said flow mechanism by generated pressure acting upon said member.

10. In a governing system, the combination comprising pressure generating means, hydraulic actuating means therefor having flow control mechanism, a member controlled by the generated pressure, and means, for controlling said flow mechanism, actuated by fluid pressure flowing to said hydraulic actuating means, and means for actuating said flow mechanism by the generated pressure acting upon said member, whereby said latter means is controlled automatically in accordance with the operation of said pressure generating means.

11. In a governing system, mechanism for controlling flow through a passage leading to a fluid actuated prime mover comprising, a fluid pressure generating unit driven by said prime mover a flow control member for said passage and means for actuating said member, including a piston and cylinder for opening said control member, means for allowing constant communication of fluid pressure from the flow passage to the opening end of said cylinder, means permitting fluid flow from said opening cylinder end to the closing end thereof and means for controlling discharge of fluid from said closing end automatically in accordance with the degree of pressure generated by said unit.

12. In a governing system, mechanism for controlling flow through a passage leading to a fluid actuated prime mover comprising a fluid pressure generating unit, a flow control member, means for actuating said member, including a piston and cylinder, means for conducting fluid pressure from the flow passage to one end of said cylinder to move said flow controlling member in an opening direction to allow fluid flow, and means for limiting the opening movement of said controlling member automatically in accordance with the degree of pressure generated by said unit.

13. In a governing system, mechanism for controlling flow through a passage leading to a fluid actuated prime mover comprising a fluid pressure generating unit driven by said prime mover, a flow control member for said passage, and means for actuating said member including a piston and cylinder, and means for conducting fluid pressure from the flow passage to one end of said cylinder to allow fluid flow, and means for controlling discharge from said cylinder end automatically in accordance with the degree of pressure generated by said unit.

14. In a governing system, mechanism for controlling flow to a fluid actuated prime mover having a passage for conducting fluid thereto comprising, a fluid pressure generating unit driven by said prime mover, a flow control member for said passage, and means for moving the same including a piston and cylinder, and means for admitting fluid to one end of said cylinder and for controlling exhaust of said fluid through the other end thereof.

15. In a governing system, flow mechanism for controlling flow to a fluid actuated prime mover having a passage for conducting fluid thereto comprising, a flow control member for said passage, means for moving the same including a piston and cylinder, means for admitting fluid pressure to one end of said cylinder, and means for controlling fluid pressure in the other end of said cylinder, whereby the piston may be held stationary, including fluid controlled means movable with and relative to said piston for controlling fluid in one of said cylinder ends to effect piston movement.

16. In a governing system, mechanism for controlling flow to a fluid actuated prime mover having a passage for conducting fluid thereto comprising, a fluid pressure generating unit driven by said prime mover, a flow control member for said passage, means for moving the same including a piston and cylinder, means controlled by the pressure generated by said unit and for admitting fluid to one end of said cylinder, and means movable with and relative to said piston for controlling the fluid in said cylinder.

17. In a governing system, mechanism for controlling flow to a fluid actuated prime mover having a passage for conducting fluid thereto comprising, a flow control member, means for moving the same including a piston and cylinder, means for admitting fluid to one end of said cylinder, and means movable with and relative to said piston for controlling the fluid therein, and yieldable means for effecting movement of said latter means to discharge fluid from said cylinder.

18. In a governing system, mechanism for controlling flow to a fluid actuated prime mover having a passage for conducting fluid thereto comprising, a flow control member, means for moving the same including a piston and cylinder, means for admitting fluid to one end of said cylinder, means movable with and relative to said piston for controlling the fluid therein whereby said piston may be held immovably in any intermediate positions thereof, and fluid pressure actuated means for effecting movement of said latter means relative to said piston.

19. In a governing system, mechanism for controlling flow to a fluid actuated prime mover having a passage for conducting fluid thereto comprising, a flow control member, means for moving the same including a piston and cylinder, means for admitting fluid to one end of said cylinder, means movable with and relative to said piston for controlling the fluid therein, and a spring for moving said latter means in one direction and fluid pressure means for moving the same in an opposite direction.

20. In a governing system, control mechanism for a hydraulic prime mover having a passage through which fluid is conducted thereto comprising, a fluid pressure generating unit driven by said prime mover, a member for controlling flow through said passage, actuating means for said control member including piston and cylinder elements, means for admitting pressure to one end of said cylinder for moving said control member in one direction, positioning means for controlling said fluid adapted to have a position corresponding to that degree of opening of the flow control member, and means for controlling the position of said latter means in accordance with the degree of fluid pressure generated by said unit.

21. In a governing system, mechanism for controlling flow to a fluid actuated prime mover having a passage for conducting fluid thereto comprising, a flow control member, means for moving the same including a piston and cylinder, means for admitting fluid to one end of said cylinder, control means movable with and relative to said piston for controlling the fluid in said cylinder, a spring for moving said control means in one direction and fluid pressure means for moving the same in an opposite direction, and means providing a source of pressure for operating said fluid pressure means whereby the position of said fluid pressure means is controlled by the degree of source pressure therefor.

22. In a governing system, mechanism for controlling flow to a fluid actuated prime mover having a passage for conducting fluid thereto comprising, a flow control member, means for moving the same including a piston and cylinder, means for admitting fluid to one end of said cylinder, control means movable with and relative to said piston for controlling the fluid in said cylinder, a spring for moving said control means in one direction and fluid pressure means for moving the same in an opposite direction, means providing a source of pressure for operating said fluid pressure means, the position of said fluid pressure means being controlled by the degree of source pressure therefor, and means for varying said position when said source pressure falls to permit discharge of fluid from the cylinder and thereby effect greater fluid flow past the flow control member.

23. In a governing system, mechanism for controlling flow of fluid to a fluid actuated prime mover having a passage for conducting fluid thereto comprising a fluid pressure generating unit driven by said prime mover, a flow control member, fluid controlled means for actuating said member, and positioning mechanism for said latter means controlled by fluid pressure from said generating unit and movable relative to said actuating means.

24. In a governing system, mechanism for controlling flow of fluid to a fluid actuated prime mover having a passage for conducting fluid thereto comprising a fluid pressure generating unit driven by said prime mover, a flow control member, fluid controlled means for actuating said member, positioning mechanism for said latter means controlled by fluid pressure from said unit, and means whereby variations in pressure from said unit permits a changed position of said positioning means and accordingly a changed position of the flow control member.

25. In a governing system, a hydraulic turbine gate controlling mechanism comprising a member for moving the gate mechanism, piston and cylinder elements for actuating said member, means for admitting fluid to one end of said cylinder to move said gate mechanism in an opening direction, means forming an atmospheric passageway through which the cylinder fluid may be discharged, and means for controlling said passageway including a member adapted to be moved in one direction by fluid pressure to close said passageway and means adapted to move said member in an opposite direction to open said passageway, both of said means for moving said member in opposite directions being adapted to produce balanced forces whereby said member and piston will remain stationary.

26. In a governing system, a hydraulic turbine gate controlling mechanism comprising a member for moving the gate mechanism, piston and cylinder elements for actuating said member, means for admitting fluid to one end of said cylinder to move said gate mechanism in an opening direction, mean forming an atmospheric passageway through which the cylinder fluid may be discharged, means for controlling said passageway including a member adapted to be moved in one direction by fluid pressure to close said passageway and means adapted to move said member in an opposite direction to open said passageway, both of said means for moving said member in opposite directions being adapted to produce balanced forces whereby said member and piston will remain stationary, all of said parts being so arranged that when the balance is disturbed said piston will move in the direction of the greater force.

27. In a governing system, a hydraulic turbine gate controlling mechanism comprising a member for moving the gate mechanism, piston and cylinder elements for actuating said member, means for admitting fluid to one end of said cylinder to move said gate mechanism in an opening direction, means forming an atmospheric passageway through which the cylinder fluid may be discharged, means for controlling said passageway including a member adapted to be moved in one direction by fluid pressure to close said passageway, and means adapted to move said member in an opposite direction to open said passageway, said latter means being adjustable to effect different predetermined stationary positions of said piston for a given pressure which actuates the fluid actuating means.

28. In a governing system for a hydraulic turbine having a nozzle, a needle valve cooperating therewith, an inlet passage leading to said nozzle, a needle valve rod, a piston carried thereby, a cylinder within which said piston is disposed, a passage leading from said inlet to the inner end of said cylinder, a passage leading from said inner cylinder end to the rear end of said cylinder, a head on the rear end of said cylinder having an opening, a rod carried by said piston and projecting rearwardly therefrom through said opening, said projecting rod having a passage allowing communication between the rear end of said cylinder and the outside thereof, a controlling valve adapted to control said communication, a spring for moving said controlling valve in one direction and a fluid pressure piston and cylinder for moving said controlling valve in the opposite direction.

29. A fluid supply controlling mechanism comprising a fluid actuated prime mover having a valve for controlling the actuating fluid thereto, means for actuating said valve including piston and cylinder elements having associated therewith as a unitary structure a member for controlling the fluid to said cylinder, and means comprising a self-contained separable unit having an element in only contacting engagement with said member for actuating the same whereby disalignment may be had with said member without affecting the same.

30. A fluid supply controlling mechanism comprising a fluid actuated prime mover having a valve for controlling the actuating fluid thereto, and means for operating and controlling said valve including piston and cylinder elements, a member for controlling fluid pressure for said cylinder and movable relative to said piston, means comprising a self-contained separable unit having a fluid operated element in only contacting engagement with said member for actuating the same, and means for supporting said element whereby any variations from their normal operative relation is not transmitted from one to the other.

31. In a governing system, a fluid pressure generating device, actuating means therefor, and means for controlling said actuating means including a piston and cylinder, means for suppyling operating fluid thereto, a pilot valve for controlling said operating fluid and being movable with and relative to said piston, a spring for moving said pilot valve in one direction and a fluid actuated piston for moving said pilot valve in the opposite direction, whereby when the opposing forces of said pilot valve, piston and spring are equal, flow of fluid to said cylinder is substantially prevented thereby maintaining said controlling piston stationary.

32. In a governing system, mechanism for controlling fluid pressure comprising a valve member, actuating means for moving said valve member in one direction by fluid pressure, including means normally moving to control said fluid pressure, and adjustable mechanism for limiting the degree of movement of said controlling means.

CHARLES A. JACKSON.